(No Model.) 2 Sheets—Sheet 1.

A. L. THOMPSON.
TIGHTENER AND FASTENER FOR FENCE WIRES.

No. 449,450. Patented Mar. 31, 1891.

Witnesses:
Otto Hoddick.
Henry W. Brendel.

Inventor
Adelbert L. Thompson
By his Attorney
James C. Stroup

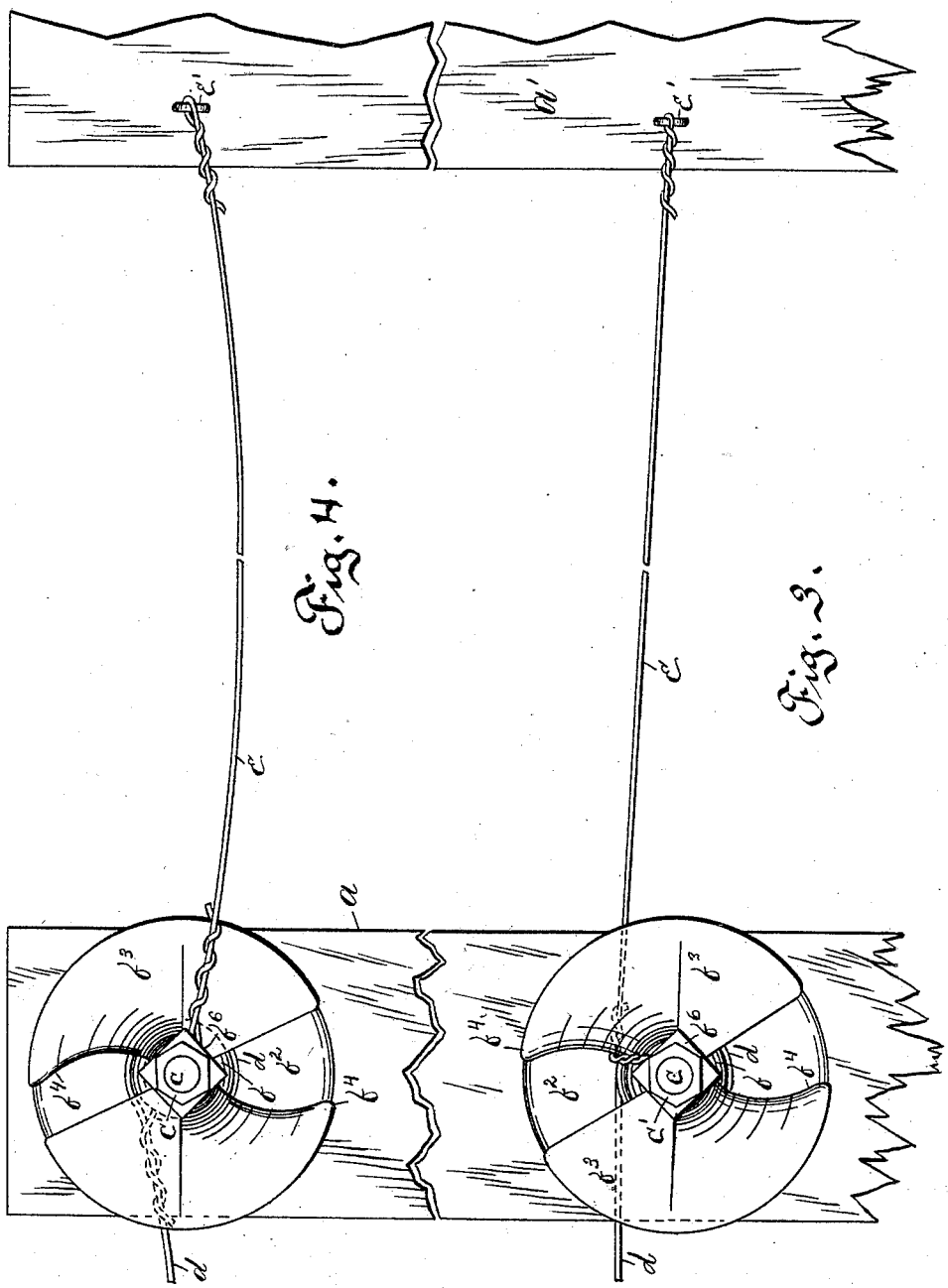

UNITED STATES PATENT OFFICE.

ADELBERT L. THOMPSON, OF EAST AVON, NEW YORK.

TIGHTENER AND FASTENER FOR FENCE-WIRES.

SPECIFICATION forming part of Letters Patent No. 449,450, dated March 31, 1891.

Application filed July 12, 1889. Serial No. 317,352. (No model.)

*To all whom it may concern:*

Be it known that I, ADELBERT L. THOMPSON, a citizen of the United States, residing at East Avon, in the county of Livingston and State of New York, have invented certain new and useful Improvements in Tighteners and Fasteners for Fence-Wires and for other Like Purposes; and I do declare the following to be a full, clear, and exact description of the invention, such as will enable others skilled in the art to which it appertains to make and use the same, reference being had to the accompanying drawings, which form part of this specification.

My invention relates more particularly to an apparatus for tightening wires when used for making fences, or when used for making trellises in vineyards, or for other like purposes.

The object of my invention is to avoid the difficulty occasioned by the expansion of the wires by heat or cold and to prevent the sagging of the wires or loosening of the posts.

By the use of my invention the wires on a fence or trellis can be loosened in the fall and tightened again in the spring by a few moments' labor, thus avoiding all breaking of wires or loosening of posts. The wires on trellises can be tightened while loaded with vines and fruit without injury to either. The tighteners are made right and left, so that they can be used at either end of a fence or trellis. It requires one to each wire, and they are placed upon the second post with a short wire running from the tightener to the first post. This short wire is for the purpose of locking the tightener when the long wire is drawn to the desired tension. The wires are fastened firmly only to the end posts, and to all intermediate posts by loose staples through which they can slip easily when being tightened.

I will now proceed to describe my invention, reference being had to the annexed drawings.

Figure 1:
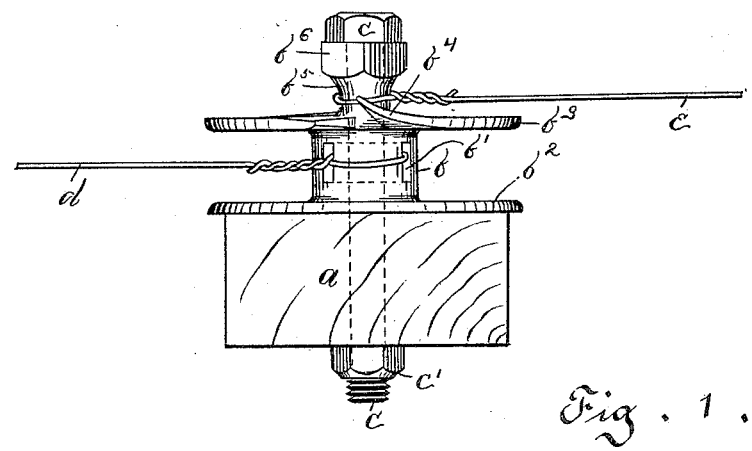
Figure 2:
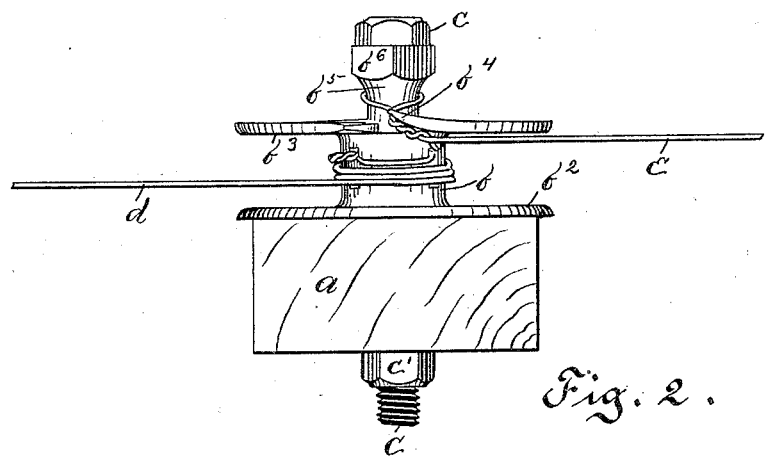

Figure 1 is a top view of the entire device, as well as the post to which it is attached, showing wire as at first connected and not drawn tight. Fig. 2 is also a top view of the entire device, as well as the post to which it is attached, showing the wires drawn tight and locked. Fig. 3 is a front view of the outer flange $b^3$, with post, showing the wires drawn tight and the short wire E as caught and locked by the projecting edge $b^4$ of the outer flange $b^3$. Fig. 4 is also a front view of the outer flange $b^3$, with post, showing the wires loose and unlocked.

The following is a detailed description of said drawings.

Like letters represent like parts.

$a$ represents the second post in the fence, to which the tightener is fastened.

$a'$ represents the first post in the fence, to which the short line $e$ is secured.

$b$ is the body of the tightener, and $b'$ a transverse orifice through the body of the tightener for securing the main wire $d$.

$b^2$ is the flange of the tightener, which rests against the fence-post.

$b^3$ is the outer flange.

$b^4$ are outward projections from the flange $b^3$ for the purpose of catching the short wire and locking the tightener.

$b^5$ is the neck of the tightener, to which the short wire $e$ is secured.

$b^6$ is the head of the tightener for manipulation with a wrench.

$c$ is a bolt or wood-screw securing the tightener to the fence-post.

$c'$ is a nut locking the same.

$d$ is the long wire, and $e$ the short wire running from the tightener to the first post.

$e'$ are staples holding the short wire to the first post.

It will be seen that the short wire $e$ is looped loosely around the neck of the tightener $b^5$, which is hollowed for that purpose, so that the tightener can be turned to tighten the long wire $d$ without tightening the short wire $e$, that being instantly tightened when caught by the projecting edge of the flange $b^3$, after letting up on the wrench, and it also at the same time locks the tightener. The wire $d$ can be fastened by looping around the flange $b^3$ or by being put through a hole made in the flange for that purpose, either of which ways would come within the principle of this invention.

It is not to be supposed that this tightener can only be placed upon the second post. It can be placed on any post in the line, but preferably upon the second.

To operate my invention, one end of the long wire $d$ is put through the transverse orifice $b'$ in the body of the tightener $b$, the other end being carried to the farthest post in the line of the fence or trellis desired and there securely fastened. It is then fastened to each intermediate post by a loose staple, through which it can slip easily when being tightened. The short wire $e$ is then looped loosely around the neck of the tightener $b^5$ and run to the first post, drawn as tight as it can be by hand, and securely fastened. If the tightener is placed on any other post than the second one, of course this short wire $e$ will be fastened to all intermediate posts by loose staples, through which it can slip easily when being tightened. A wrench is then applied to the head of the tightener $b^6$ and turned until the long wire $d$ is drawn to the desired tension. The short wire $e$ is then pushed over one of the projections $b^4$ of the outer flange $b^3$. The wrench is then slowly eased up until the short wire $e$ firmly locks the tightener. The same process is used, of course, when making a trellis for grapes, or anywhere else where tight wires are desired to be run.

I am aware that "tighteners and fasteners" for wires have been patented and used prior to my invention, and therefore do not claim the broad principle; but

What I claim as my invention and improvement, and for which I desire to secure Letters Patent, is—

A wire-tightener consisting of a hub or body $b$, having the transverse orifice $b'$, the inner and outer flanges $b^2$ and $b^3$, formed as described, the neck $b^5$, and the head $b^6$, all integral with each other, in combination with the wood-screw or bolt C and nut C', all substantially as shown.

In testimony whereof I have signed my name to this specification in the presence of two subscribing witnesses.

ADELBERT L. THOMPSON.

Witnesses:
 JAMES C. STRONG,
 OTTO HODDICK.